June 28, 1932.  T. G. CASTNER  1,864,527
MEASURING APPARATUS
Filed Oct. 4, 1930
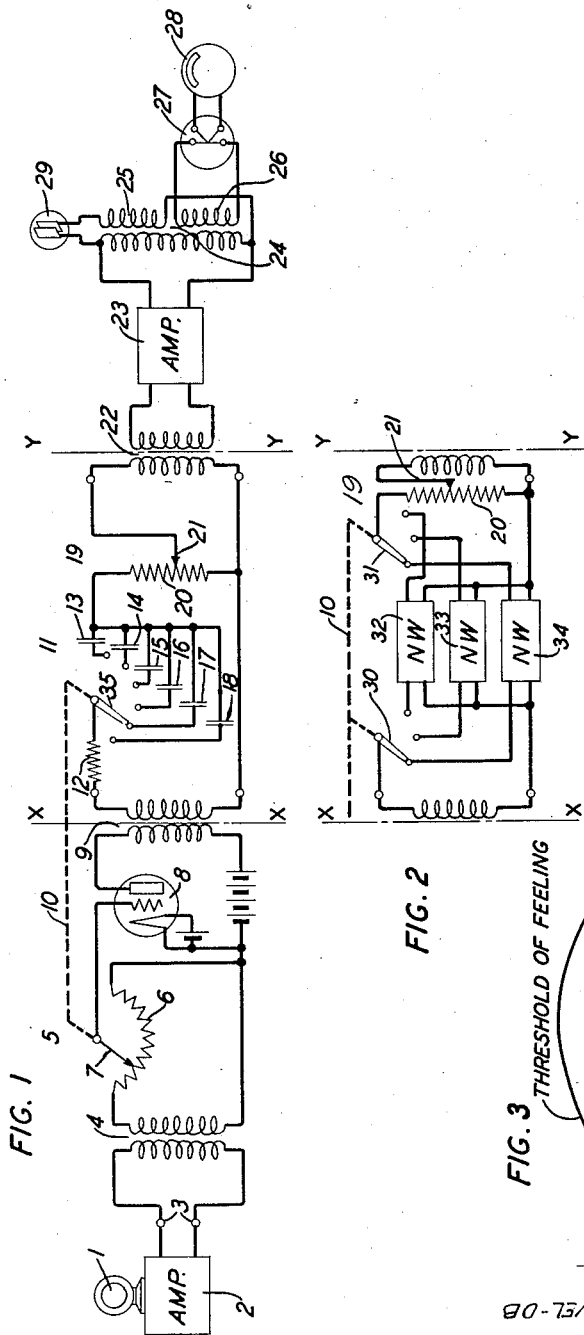
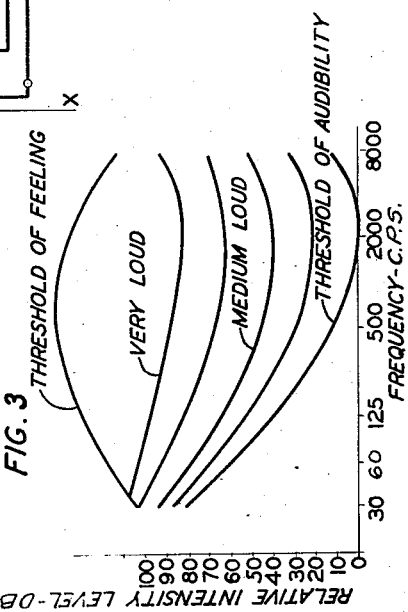
INVENTOR
T. G. CASTNER
BY
ATTORNEY Patented June 28, 1932

1,864,527

UNITED STATES PATENT OFFICE

THEODORE G. CASTNER, OF EAST ORANGE, NEW JERSEY, ASSIGNOR TO BELL TELEPHONE LABORATORIES, INCORPORATED, OF NEW YORK, N. Y., A CORPORATION OF NEW YORK

MEASURING APPARATUS

Application filed October 4, 1930. Serial No. 486,502.

This invention relates to measuring apparatus and more particularly to apparatus for determining the loudness value of electric or acoustic waves.

It is an object of the invention to increase the accuracy and simplify the manipulation of loudness level measuring devices.

In apparatus used heretofore in the measurement of the loudness level of sounds such as speech, music, and noise or in the measurement of the loudness value of such waves as they occur in electrical circuits, the waves are converted, if necessary, to their equivalent electrical form and their energy above a selected reference level of zero loudness is determined. It has been recognized that energy level is not a true measure of the loudness of a sound, the ear being more sensitive to waves having a frequency of the order of two thousand cycles per second than to waves of either higher or lower frequencies. It has also been found that the weight to be given a wave of particular frequency, in measuring the loudness of a sound, is not constant but is a function of the energy level of the sound itself. This response of the human ear is simulated in a loudness level measuring set disclosed in a patent application of J. M. Barstow, Serial No. 492,066, filed October 29, 1930, which utilizes a plurality of weighting networks having frequency-attenuation characteristics adapted to weight waves according to their importance from a loudness standpoint. The particular network to be used for a given measurement is determined by the loudness level of the given sound. The waves to be measured are passed through a weighting network and a calibrated attenuating device, and the number of units of attenuation added to the circuit in order to reduce the applied wave to a predetermined zero level, as indicated by a meter, is taken as the measure of the loudness of the sound.

In accordance with the present invention, means are provided to automatically insert the proper weighting network in the circuit in accordance with the loudness level of the sound as indicated by the adjustment of the measuring set. Specifically, a mechanical arrangement operated by the variable adjusting element of the measuring set is employed.

The invention will be better understood from the following detailed description of a noise level measuring set incorporating a specific embodiment of the invention, reference being made to the drawing of which Fig. 1 is a schematic diagram of a noise level measuring set embodying the invention;

Fig. 2 shows an alternative arrangement;

Fig. 3 shows diagrammatically the characteristics of the human ear which necessitate the use of a plurality of filters; and Fig. 4 shows the characteristics of several of the weighting networks.

Fig. 1 shows a sound pick-up device represented as a condenser microphone 1 for translating sound waves into electrical waves. The microphone is connected to amplifier 2 which may be of any suitable type. When measuring the level of electrical interference, such as noise in a telephone circuit, the electrical circuit is connected to the terminals 3 of input transformer 4; when sounds, such as room noises, are under measurement the output of the transmitter amplifier 2 is connected to the input terminals 3. Following the transformer is the calibrated potentiometer or attenuator 5, the effect of which is controlled by the position of contact arm 7 on resistance element 6. The input terminals of the succeeding vacuum tube 8 are connected to the potentiometer so that the amplitude of the incoming wave may be reduced to any fractional value desired.

Coupled by the transformer 9 to the vacuum tube 8 is the weighting network or equalizer 11. As shown, this comprises fixed resistance 12 and potentiometer resistance element 20 arranged to be connected in series with one of the condensers 13 to 18 by means of switch 35. The characteristic of the filter depends on which condenser is connected in the circuit, and this in turn, because of the mechanical coupling element 10, is determined by the position of the attenuator contact 7. The exact filter characteristics, with the various condensers connected in the circuit, are selected to match response curves of the human ear as will be discussed hereinafter. Instead of putting in different condensers, a mechanical arrangement, such as shown in Fig. 2, may be provided whereby the operation of the attenuator contact 7 causes similar operation of switches 30 and 31 thereby inserting any one of the several individual networks 32, 33, or 34 into the circuit. In either case, the weighted signals next pass through an attenuator 19 which may be used for making precise adjustments of the amount of attenuation in the circuit by adjusting the position of slider 21. Following this second potentiometer, and coupled to it by transformer 22, is amplifier 23 which should have a uniform response to waves of all frequencies within the range being measured and an amplification large enough to produce readable deflections on microammeter 28. Neon lamp 29 is shunted across transformer 24 through winding 25 in order to protect the thermocouple 27 against excessive surges of current, and to give a visual indication to the operator of the presence of high peaks in the sound waves being measured.

The necessity for the use of weighting networks will be better appreciated after a study of Fig. 3, which shows that the loudness of a wave, having a given intensity level, depends on the frequency of the wave. Of two tones of medium loudness, for example one of thirty cycles and one of two thousand, that of lower frequency may have an energy content approximately fifty-three units greater than the other (referring to the curve marked "Medium loud") and yet be of the same loudness. The effect of the equivalent electrical wave on a meter, said wave being a function of the energy level of a sound, would therefore be highly misleading. To correct for this disparity in energy content a filter, or network, which attenuates waves of low frequency to a greater degree than those of high frequency, is employed. In Fig. 4, the curve which is marked "Medium loud" shows what attenuation the weighting or equalizing network must introduce at each frequency. It is also to be noted that for sounds near the threshold of audibility, such sounds being almost inaudible, there may be a greater difference in energy level between sounds of equal loudness therefore a filter having a characteristic, such as that represented by the "threshold" curve of Fig. 4, must be employed. The filter characteristics appropriate for measurements at other loudness levels are also shown in Fig. 4.

Manipulation of the set, when measuring an applied sound wave, is comparatively simple, and comprises increasing the attenuation in the circuit until the indicator of microammeter 28 is held at a predetermined position corresponding to sound of zero loudness,—that is, to sounds at the threshold of audibility. The amount of attenuation introduced into the circuit is then taken as a measure of the loudness of the sound. Since the position of the attenuator contact arm 7 indicates the loudness level of any given sound, the position of switch 35 and, the particular condenser connected in the circuit, are functions of the loudness level. By properly selecting the condenser to be associated with each switch position, the characteristic of the filter can be made to correspond with the loudness level being measured. While six different condensers have been indicated, it is possible that for some measurements a fewer number of correcting networks will be sufficient. However, when comparing sounds of approximately the same loudness, greater accuracy will be obtained with a larger number of networks. The present invention not only relieves the operator of an extra adjustment, that of switches 30, 31 and 35, but also the possibility of readings being taken with the wrong network in the circuit is considerably diminished.

Another feature of the invention resides in the circuit comprising transformer 24, thermocouple 27, microammeter 28, and neon lamp 29. Microammeter 28 is calibrated so that if an exact balance cannot be obtained by adjusting potentiometers 5 and 19 the difference may be observed on the meter. This not only permits accurate measurements to be obtained but also enables the operator to observe fluctuations in the noise level. In order that the meter may follow the fluctuations in noise level rapidly and accurately, it is essential that the inertia effects in the heater element of thermocouple 27 be very small, that is, in other words, a very delicate thermocouple should be connected to transformer winding 26. There is the danger, however, if such is done, that sudden peaks of sound may cause an excessive current to flow through the thermocouple element thereby permanently damaging the apparatus. In order to prevent this effect, a neon lamp is connected across the output of the amplifier, through transformer winding 25, and adjusted so that it breaks down when a dangerous level is exceeded. The breakdown of the neon lamp occurs very rapidly so that there is not the slightest danger of the thermocouple element being damaged. This permits a highly sensitive thermocouple microammeter combination to be employed and rapid variations in noise level to be followed. When excessive peaks are present in the sound waves the indicating element does not properly weight them from a loudness standpoint. It is desirable, therefore, that the operator be apprized when a noise wave of this type is present. The neon lamp, however, is satisfactory for this purpose inasmuch as when, abrupt large peaks occur, the lamp breaks down and gives a visual warning to the operator.

While a specific embodiment of the invention has been described it is to be understood that the invention is not limited thereto, but may find application in a wide variety of forms. The simplicity of the mechanical coupling is not to be taken as a limitation for any other form within the scope of the average mechanic, and may be designed as the complexity of the variable network elements and the number of networks to be inserted may demand.

What is claimed is:

1. A measuring device comprising means to weight applied waves on a frequency basis as a function of their loudness effect, means to attenuate said weighted waves to a predetermined reference level, and means varied in accordance with variations of the attenuating means to change the characteristics of said weighting means in accordance with the loudness value of said applied waves.

2. A loudness measuring device comprising a plurality of weighting means each adapted to weight an applied wave of a particular loudness level in accordance with the importance of its various frequency components, means to attenuate said weighted waves to a predetermined zero loudness level, and means responsive to the operation of the attenuating means to introduce the weighting means corresponding to the loudness level of said applied waves.

3. In an apparatus for simulating the response of the ear to sounds of various intensities, means to weight sound-produced electrical waves in accordance with their relative effectiveness from a loudness standpoint, and means responsive to the indication of the loudness value of said waves to adjust the weighting characteristic of said weighting means.

4. A circuit comprising means for receiving either sound waves or electrical waves of audio-frequency, means connected thereto for attenuating the waves received, means for weighting the attenuated waves, and means whereby the operation of the weighting means is determined by the operation of the means for attenuating the waves.

5. A system comprising means for receiving either sound waves or electrical waves of audio-frequency, means for the attenuation of the waves received, and means for weighting the attenuated waves in accordance with the loudness of the particular sound being measured, said weighting means operating in response to the operation of said attenuating device.

6. In a loudness measuring set capable of receiving electrical waves of audio-frequency and comprising means for converting sound waves into electrical waves, means for attenuating said electrical waves, means to correct the variations in intensity level of a sound of constant loudness as the frequency of said sound varies, said means comprising a weighting network of non-uniform characteristic, means to indicate when said waves are attenuated to a predetermined reference level, and means varied in accordance with variation of the attenuating device for adjusting the correcting device.

7. A system, capable of receiving either sound waves or electrical waves of audio-frequency, comprising means for the attenuation of said waves, means connected thereto for weighting the attenuated waves in accordance with the loudness of the particular sound being measured, said means comprising a plurality of weighting networks each of which has a different characteristic, said characteristics being comparable to various equal loudness response curves of the ear, and means whereby the operation of weighting is determined by the operation of the said attenuating device.

8. An indicating device which comprises means for attenuating either sound waves or electrical waves of audio-frequency, means for simulating the response of the ear to sounds of various intensities, said means consisting of a plurality of different weighting networks for weighting electrical waves in accordance with the loudness of their equivalent sound waves, means whereby the particular weighting network to be used is determined by the operation of the attenuating device.

In witness whereof, I hereunto subscribe my name this 30th day of September, 1930.

THEODORE G. CASTNER.